United States Patent
Plasmati-Lüchinger

(10) Patent No.: US 6,189,735 B1
(45) Date of Patent: Feb. 20, 2001

(54) METHOD AND DEVICE FOR THE EXTRUSION OF A POLYMERIC SUBSTANCE

(75) Inventor: Maria Teresa Plasmati-Lüchinger, Coldrerio (CH)

(73) Assignee: Cheming S.A. Luxembourg, Luxembourg (LU)

(*) Notice: Under 35 U.S.C. 154(b), the term of this patent shall be extended for 0 days.

(21) Appl. No.: 09/341,479

(22) PCT Filed: Jan. 9, 1998

(86) PCT No.: PCT/IB98/00021
§ 371 Date: Aug. 24, 1999
§ 102(e) Date: Aug. 24, 1999

(87) PCT Pub. No.: WO98/30373
PCT Pub. Date: Jul. 16, 1998

(30) Foreign Application Priority Data

Jan. 10, 1997 (CH) .............................................. 41/97

(51) Int. Cl.$^7$ ............................................................ B29B 7/74
(52) U.S. Cl. .................... 222/1; 222/135; 222/145.5; 222/309; 222/334; 222/401; 222/394
(58) Field of Search ..................... 222/1, 145.1, 145.5, 222/145.6, 309, 334, 394, 397, 401, 402

(56) References Cited

U.S. PATENT DOCUMENTS

| | | | | |
|---|---|---|---|---|
| 3,541,023 | * | 11/1970 | Cole, III | 222/135 |
| 4,341,327 | * | 7/1982 | Zeitz | 222/135 |
| 4,955,544 | * | 9/1990 | Kopp | 239/304 |
| 5,092,492 | * | 3/1992 | Centea | 222/334 |
| 5,224,629 | * | 7/1993 | Hsich | 222/145.6 |
| 5,566,860 | * | 10/1996 | Schiltz | 222/145.6 |
| 5,791,522 | * | 8/1998 | Lee et al. | 222/145.5 |
| 5,857,589 | * | 1/1999 | Cline et al. | 222/1 |

* cited by examiner

Primary Examiner—J. Casimer Jacyna
(74) Attorney, Agent, or Firm—Young & Thompson

(57) ABSTRACT

The polymeric substance delivery method and device, in which the outflow is determined from a first container (5) of a monomeric substance able to polymerize autonomously upon air contact, and eventually, the outflow from a second container (7) is determined of a hardening substance able to accelerate the polymerization of the monomeric substance, by sending the same hardening substance towards a mixing zone of the hardening substance with the same monomeric substance.

17 Claims, 3 Drawing Sheets

METHOD AND DEVICE FOR THE EXTRUSION OF A POLYMERIC SUBSTANCE

U.S. Pat. No. 5,092,492 and EP patent No. 287,043 describe two devices suitable to deliver two liquid or pasty substances destined to be mixed together. Both these devices are provided with two originally pressurized containers, that contain respective liquid or pasty substances and respective quantities of propellant substances.

The delivering devices described in the above patents are complex and expensive and require, in particular, the production of two pressurized containers provided with respective valve means. Owing to the fact that a propellant substance must be inserted in both containers, together with the liquid substances that must be delivered, it is necessary, when producing the containers themselves, to utilize two delivering units in order to insert the propellant substances in the containers.

Further, the above pressurized containers are not re-usable, and the fact that it is relatively expensive to produce them strongly affects the utilization costs of the whole delivering devices, owing to the fact that the delivering devices themselves are evidently intended for a professional use and involve a wide utilization of pressurized containers.

BACKGROUND OF THE INVENTION

The present invention is relative to a method for the extrusion of a polymeric substance.

As already known, the polymerization of a monomeric substance emission from a container occurs in many cases due to the effect of the mixing of the same substance, before the output from the same container, with a prefixed quantity of a certain liquid, for example, constituted by additive water or at least with other substances or other liquids which are different in dependence from the type of monomeric substance in question.

The said liquid, when simple water, is usually supplied from air humidity in the case of single component extruder, that is to say, extruders containing only the monomeric substance inside, or is supplied following the break of a small tank housed in the container in the case of the so called "double-component" extrusion (obviously, this solution is valid for any type of liquid).

This second process should be considered as being of high technical value, as, on the contrary to what occurs with the first process, the liquid contained in the aforementioned container can be intimately mixed with the entire mass of the monomeric substance, assuring the subsequent uniform and simultaneous polymerization in all zones.

However, this second procedure has a considerable inconvenience which consists in the fact that after the mixing of the monomeric substance with the liquid, there is only a very brief period of time available (some minutes), in which the whole mass completes its polymerization. This means that, if for any such reason it has not been possible to proceed to the whole substance extrusion housed in the container, the polymerized quantity left in the same container, hardens and so becomes useless.

Therefore, independently, from the objective use requirements, in a polymeric substance extrusion container which functions in the above described method, within a few minutes the unextruded mass is no longer able to be used, and constitutes together with its container "special waste-"which is complicated and expensive to dispose of.

SUMMARY OF THE INVENTION

In order to use the two-component process without encountering the above mentioned inconveniences, the aim of the present invention is to supply a simple and economic invention , and a device which accomplishes such a method, suitable to permit the use, by obtaining an excellent polymerisation, only the quantity of monomeric substance necessary from time to time, without prejudicing at all the substance characteristics which provisionally remain unused in a container, in order to permit the use when necessary.

Moreover, the result is that any type of operation including the extrusion of a polymeric substance is able to be effected, using the proposed method and the device, with the due care and attention, without the harassment of having to use the whole container load within a prefixed time limit. According to the present invention, a method is supplied for the extrusion of a polymeric substance, characterized by the fact of including the phases of determining the outflow, from a first pressurized container making part of a device for the extrusion of the polymeric substance itself, of a monomeric substance able to autonomally polymerize upon air contact; if desired, to determine the outflow from a second container that, when the said device is not in use, is not pressurized, of a hardening substance able to accelerate the polymerization of the monomeric substance; and sending the same hardening substance towards a mixing zone of the hardening substance itself with the monomeric substance.

Moreover, the present invention is relative to an extrusion device for a polymeric substance.

According to the present invention, a device is realized for the extrusion of a polymeric substance, characterized by the fact of comprising a first pressurized container housing internally a monomeric substance able to autonomously polymerize one in air contact; a second container suitable for housing internally a hardening substance able to accelerate the polymerization of the monomeric substance, the second container, when the device is not in use, being not pressurized; a first conduit suitable to conduct the monomeric substance towards the output station of the monomeric substance itself from the device, and a second conduit suitable, if desired, to conduct the outflowing hardening substance from the second container towards a mixing zone of the hardening substance itself with the monomeric substance; the device also comprising first obstruction means suitable to determine, on command, the outflow of the monomeric substance from the device itself, and second obstruction means suitable to determine, on command, the sending of the hardening substance eventually present within the second container towards the mixing zone.

According to the present invention, a device is realized for a polymeric substance extrusion which is characterised by the fact of including a first container housing within its' internal, a monomeric substance able to autonomously polymerize once put into contact with air;and a second container suitable to house a hardening substance in its internal which is able to accelerate the polymerization of the said monomeric substance, and a first conduit suitable to drive the said monomeric substance towards an output station of the same monomeric substance of said device, and a second conduit suitable to conduct the hardening substance eventually outflowing from said second container towards a mixing zone of the same hardening substance with the said monomeric substance; and the first obstruction means being provided which are suitable to determine, on comand, the outflow of the said monomeric substance from the said device, and the second obstruction means suitable to determine, on comand, the sending of the hardening substance eventually present within the said second container towards the said mixing zone.

BRIEF DESCRIPTION OF THE DRAWINGS

The invention will now be described with reference to the annexed designs, which represent a preferred form of non limitative accomplishment, in which.

DESCRIPTION OF THE PREFERRED EMBODIMENTS

Figures 1, 5:
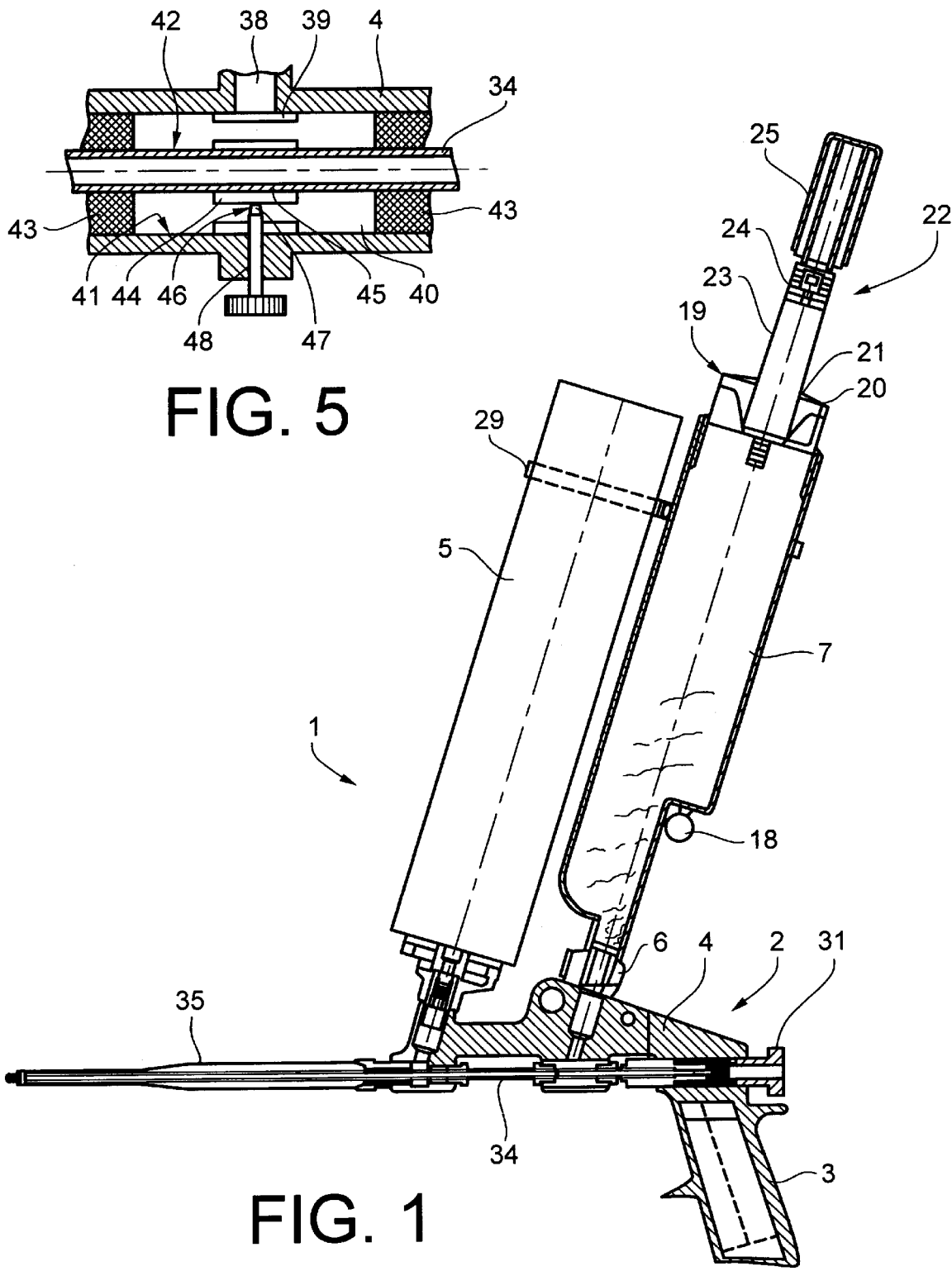
FIG. 1 represents a partially cross-section lateral view, of an extrusion device for the polymeric substance realized in accordance with the present invention.

With reference to FIG. 1, a device 1 for the polymeric substance extrusion includes.

Figure 2:
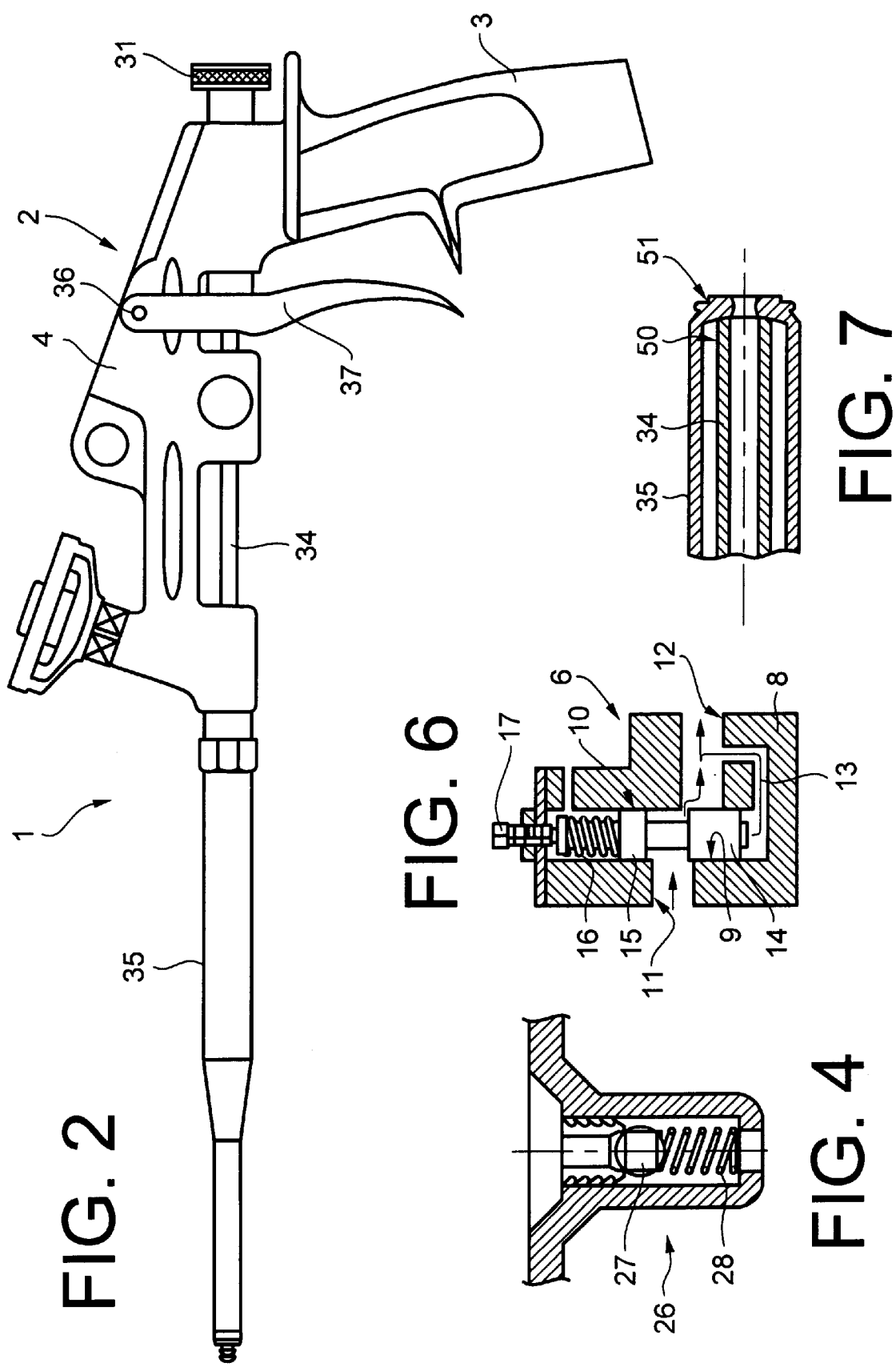
FIG. 2 represents a schematic lateral view of the extruder device in FIG. 1.

A "gun" element indicated in it's complex with (2), of which a handgrip 3 is part and a substantially horizontal extended element 4 (FIG. 1 and 2) and presenting a portion of the superior end connected to the same handgrip 3. Some components (4) are combined to such extended element, which will be described as follows, and which are suitable to extrude the mentioned polymeric substance.

To a superior part of the extended element (4), the outlet nozzle of a first container (5) being essentially cylindric, is positioned in proximity to the handgrip (3), and connected in a known way, through screw-female thread connection, and internally housing a constituted monomeric substance, for example, by a urethane composition in liquid form, and a certain quantity of a gassy propellent substance having a pressure superior to the atmospheric pressure. The container (5) outlet nozzle is equipped, in a known and not represented way, with a valve element able to hermetically maintain closed the same container (5) until the moment in which it is connected, usually through screwing, to the extended element (4), which permits the outflow from the mentioned outlet nozzle of the housed substance in container (5) after the same container (5) has been connected to the extended element (4). The mentioned monomeric substance housed within the container (5) is able, when exposed into the environment, to polymerize without the addition of hardening substances, combining, for example with the humidity contained in the air; however, such polymerization without the addition of hardening substances, is verified in a relatively long time.

To a superior part of the extended element (4) situated essentially in correspondence to a median part of the same extended element (4), a second essentially cylindric container (7) is connected, through a pressure regulator device indicated in it's complex with (6) and preferably through use of screwfemale thread connections, the said second container (7) being suitable to house in it's internal, a preferably liquid hardening substance, preferably constituted by water, being able to, when mixed with the quoted urethane compound, to accelerate the polymerisation of the same compound.

According to that which is illustrated in FIG. 6, the pressure governor (6), of a known type, includes an adjusting block (8) equipped with a closed hollow cylinder (9) at its' axial ends; within such cavity a smooth-sliding, liquidtight slider (10) is installed, placed at right angles at two passages (11) and (12), respectively at the fluid influx and offtake, which pressure must be regulated, being situated at opposite bands with respect to the same slider (10).

A conduit (13) leaves from the offtake passage (12), in the adjusting block internal (8), and disembogues in correspondence to an end portion of the mentioned cavity (9).

The slider (10) is defined by two end cylindric parts (14) and (15), (respectively inferior and superior in FIG. 6) having an approximate diameter less than the cavity diameter (9), the same are connected between themselves by a shaft (16) which has a diameter which is inferior to those of the same end parts (14) and (15). A helicoid spring (16) functioning by compression is coaxially positioned withing the cavity (9), and axially drives the slider (9) towards the cavity (9) end communicating with the conduit (13). The force with which the helicoid spring (16) acts on the slider (10) can be regulated by adjusting an external thread element (17), being screwed in the adjusting block (8) and suitable to push the same hecoidal spring with variable force (16) against the same slider (10).

While functioning, the pressure of the liquid flowing out of the offtake passage (12) is regulated to requirement, and is maintained equal to the desired pressure value, after having set the force through the external thread element (17), by which the helicoidal spring (16) presses on the slider (10). Such automatic regulation occurs in virtue of the fact that a part of the liquid flowing through the offtake passage (12) constantly flows into the conduit (13), consequently pressing the end cylindric part (14) facing the same conduit (13) towards the helicoidal spring (16) with a force which is in function to the pressure which the same liquid presents with the offtake passage (12); as a result of that, the end cylindric part (14) obstructs the part of the cavity (9) that connects the passages (11) and (12) to the measure that, the higher the pressure is, the higher the pressure tends to be between the offtake passage (12), with the effect of reducing or increasing such pressure till it is carried to the desired value and to maintain it equal to such value.

In accordance to the illustration in FIG. 1, a portion of the container (7) is connected to a known pressure gauge element (18), which is capable of supplying a visual indication relative to the existing pressure in the internal of the same container (7).

A part of the container (7) being axially opposite with respect to the same container outlet nozzle is defined by a cap element (19), coaxially screwed on the body of the container (7) to reclose the part which is principally distanced from the extended element (4). It should be noted that, in alternative, the container (7), may be equiped at any of its points with an opening (not represented) being sealable through a removable tap (not represented).

A circular bottom wall (20) of the cap element (19) is equipped with a coaxial circular opening (21), to which a pump element is connected, as indicated in its complex by (22). Said pump element (22) comprising of a cylindric element (23) being partially inserted in the (19) coaxially integral cap element, with its median zone at the mentioned opening(21); within such cylindric element, a smooth sliding piston element is coaxially installed, to which the same cylindric element (23) is externally connected, by a handgrip (25) used to impart to the piston element (24) a convenient number of strokes in the two directions within the cylindric element (23) with the objective of letting into the container (7) higher air pressure than the atmospheric pressure.

A known type of non-return valve (26), represented in FIG. 4 and essentially comprising a small ball (27) and a helicoidal spring (28) able to drive the same small ball (27) and a helicoidal spring against a matching surface of the cylindric element (23), is associated at the end of the same cylindric element (23) placed within the cap element (19).

The mentioned containers (5) and (7) are both connected, in correspondence to the respective zones, and conveniently distanced from the extended element (4), by a strip element (29) which encloses and renders them substantially integral between them.

Figure 3:
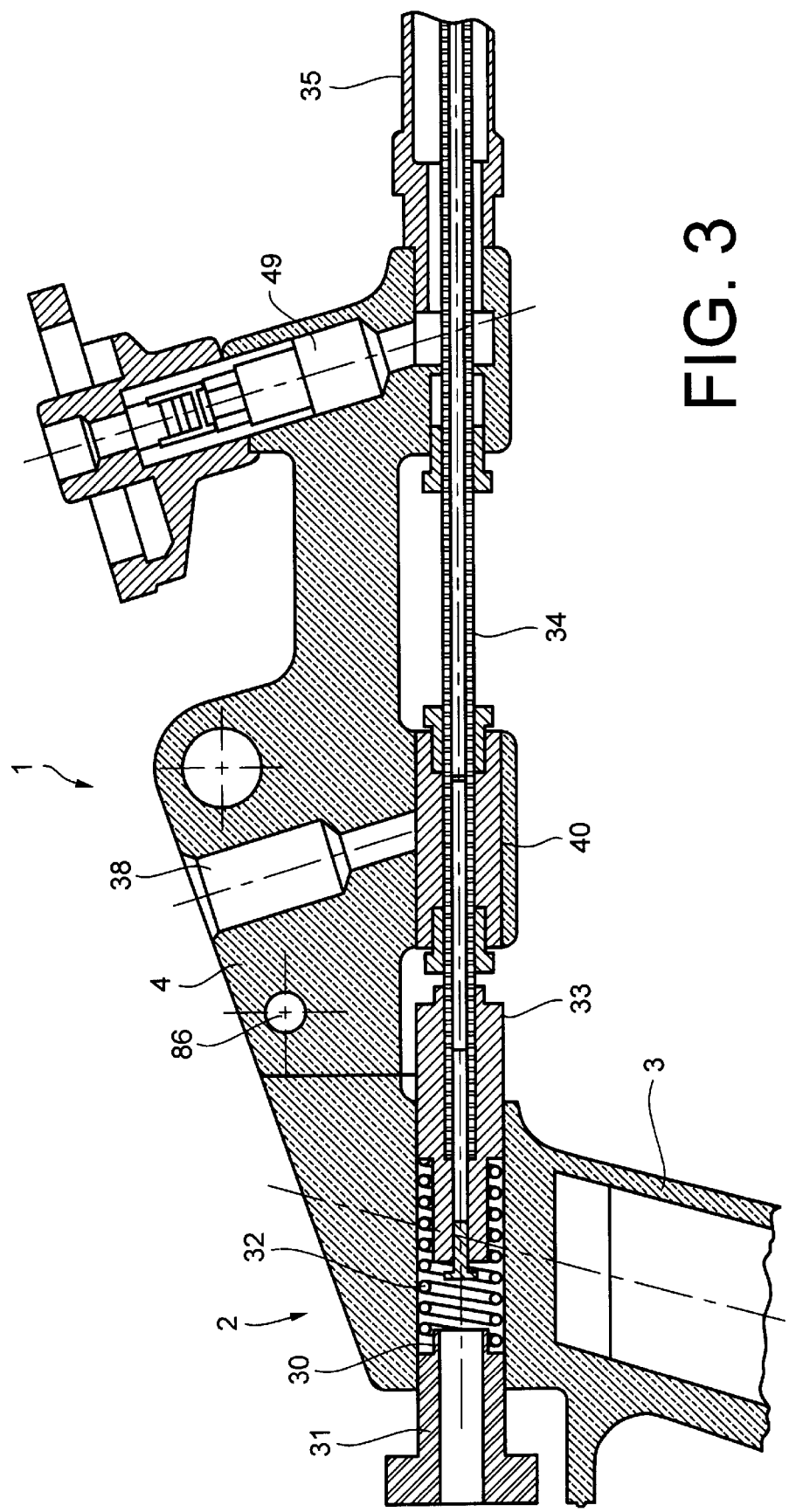
FIG. 3 represents a partial section view of the extruder device of FIGS. 1 and 2; and FIGS. from 4 to 7 represent some details of the extruder device of the preceding figures.

According to what is represented in the FIGS. 1 and 3, in a horizontal threaded hole (30) obtained in a superior part of the handgrip (3) an end portion of the plug element (31) is screwed on. Such plug element by means of a helicoidal spring (32) functioning by compression is placed within the said hole (30) axially pushing an essentially cylindric element (33) to the free end of the hole (30). Coaxially connected to the free end of such element (33) is a liquidtight first conduit or tubular element (34), which extends beyond the free end of the extended element (4) and is coaxially enclosed, starting from an essentially coinciding zone with the free end of the same extended element (4), by a second conduit or tubular element (35), one of which end portion is supported by the free end of the same extended element (4).

A portion of the extended element (4) above the handgrip (3) supports, by means of a horizontal pin (36), in a rotating manner, a superior end of a trigger element (37), of which an intermediate portion borders and binds, in a known and not represented method, the end of the element (33) turned towards the free end of the extended element (4): when the lower portion of the handgrip element (37) is moved manually towards the plug element (31), the (33) element and the tubular element (34) are axially dragged towards the same plug element (31), with the following consequences which will result being clear.

The screw element of the plug element (31) determines the force with which the handgrip element (37) resists to the manual traction towards the same plug element (31).

In accordance to what is represented, in particular, in FIGS. 3 and 5, the output nozzle of the container (7), communicates with a conduit (38) obtained in the extended element (4), which in turn communicates with a toriodal chamber (39) obtained on the external peripheral surface of a hollow cylindric element coaxially housed within a cylindric cavity (41) of the same extended element (4). Such hollow cylindric element (40) houses the mentioned cylindric element (34), in a sliding manner with a modest gap, within its' internal cavity (42), and it is connected to the extended element (4) in a stable manner by means of two threaded arrest elements (43) (only partially illustrated in FIG. 5) which borders the axial ends.

The internal cavity (42) of the hollow cylindric element (40) is concerned with a toroidal chamber (44), which encloses a portion of the tubular element (34) equipped with a radial hole (45). The toroidal chambers (39) and (44) are both connected by an essentially conic shaft hole, within which it can bind in variable measures the conic shaft end (47) of a half obstruction made up of a screw element (48) screwed in a threaded hole obtained in the extended element (4). A higher or lower screwing of the external thread element (48) corresponds to a higher or lower obstruction of the hole (46) from the end part (47) of the same screw element (48), with a consequent lower or higher free flow of the liquid housed in the container (7) from the conduit (38) to the toroidal chamber (44). An essentially completed screwing of the external thread element (48), represented in FIG. 5, corresponds to the elimination of the communication between the conduit (38) and the toroidal chamber (44), and therefore of the container (7) with the internal cavity of the tubular element (34).

In consequence of what has been said, the end (47) of the screw element (48) and the hole (46) constitute regulating means of the rate of flow of the hardening substance coming from the container (7).

According to what has been represented, in particular, in FIG. 3, the outlet nozzle of the container (5) comunicates with a conduit (49) obtained in the extended element (4), which comunicates in turn with the liquidtight end of the tubular element (35) connected to the same extended element (4).

In accordance to the representation in figure (7), the free end (50) of the tubular element (34) internally presents an essentially truncated cone form with the crest arranged on the outside of the same tubular element (34); the end (51) of the tubular element (35) externally presents a substantially truncated cone form, able to follow axial movements of the tubular elements (34) of which it can be said, as follows, to conjugate itself in a liquidtight manner with the (50) essentially truncated cone end of the tubular element (34).

In use, the device (1) could be used to deliver the monomeric substance contained within the container (5) without adding any hardening substance to the same monomeric substance.

In such case, the container (7) may not not be filled with water or other hardening substance; in alternative, the container (7) could contain the hardening substance, but the screw element (48) could be arranged in its' highest screwed condition, with consequent impossible passage of the same hardening substance from the toroidal chamber (39) to the toroidal chamber (44) and from the latter to the internal tubular element cavity (34).

The emission of the monomeric substance for the device (1) occurs in consequence of a stoppage effected manually, of the lower portion of the trigger element (37); at such stoppage, as previously mentioned, follows a traverse of the tubular element (34) towards the handgrip (3), with consequent distancing of the end (50) of the same tubular element (34) from mentioned end (51) of the tubular element (35), and consequent free outflow, between the same two ends (50) and (51), of the monomer coming from the container (5) through the internal cavity of the tubular element (35). The mentioned ends (50) and (51), therefore, act on obstructing means able to regulate the outflow of the monomeric substance housed within the container (5).

Such monomer, as soon as it discharges from the device (1), it begins to polymerize even in absence of the added hardening substance, for example, due to the contact with the air humidity, it completes the polymerize in a relatively long time.

In the case in which one desires to add to the mentioned monomer a hardening substance in a liquid form, it is necessary to fill the container (7) at least partially with such hardening substance. Such filling, in accordance to what has been previously mentioned and with the illustration represented in FIG. 1, is effected by removing, by means of screwing off the mentioned cap element (19) from the body of the container (7).

The cap element (19) is then reapplied to the container body (7), and the pump element (22) is repeatedly actuated, acting on the handgrip (3), to generate in the internal of the same container (7), a higher pressure to the atmospheric pressure. The pressure gauge (18) element indicates the value of such pressure, and permits value verification at any moment during device use (1).

During such operations, and more generally, while the trigger element (37) is not actuated, the tubular element (34) is positioned, under the action of the spring (32), in its' maximum forward position towards the end (51) of the tubular element (35). In such conditions, the mentioned hole (45) is found outside the toroidal chamber (44), and is not in a condition to receive liquid from the container (7). The hollow cylindric element (40) and the hole (45), as a consequence of the aforementioned, act as a obstructing means able to regulate the influx, within the tubular element (34) of the hardening substance housed within the container (7).

As soon as the lower portion of the trigger element (37) is pulled back, the tubular element (34) is moved to a certain tract towards the handgrip (3), as mentioned, allowing the free passage of the monomer coming from the container (5) between the mentioned ends (50) and (51) and carrying the hole (45) within the toroidal chamber (44). In the case in which the screw element (48) does not obstruct the hole (46), the liquid contained in the container (7) begins to flow from the same container (7) towards the toroidal chamber (39) to then enter into the toroidal chamber (44) and pass from it, across the hole (45), into the internal cavity of the tubular element (34); from said tubular element (34), finally, the liquid flows in the external environment, immediately after being mixed, essentially in correspondence to the said ends (50) and (51), with the monomeric substances coming from the container (5).

The rate of flow of the hardening substance coming from the container (7) can be regulated at any moment, by acting on the screw element (17) of the pressure governor device (6) and/or on the mentioned screw element (48), such regulation can be effected without any restraint on the rate of flow of the monomer coming from the container (5)

It is important to note that, according to a variant which is not illustrated in the present invention, the described container (7) could be substituted by a prepacked pressurised bottle containing a hardening substance, constituted, for example by water; obviously, in this case, such a bottle would not be used with the described pump element (22) and the hardening substance, especially in this case, could be nebulized towards the monomer in outflow from the tubular element (35) with a dispersive "crown" effect, that is to say, through an expansion which carries the same hardening substance to gradually draw away from both the tubular element end (35) and the axis of the terminal portion of the same tubular element (35).

Moreover, it should be noted that, according to a variant not illustrated in device (1), the container (7) could present in its internal a pressure equal to the atmospheric pressure, and the hardening substance contained therein could reach the toroidal chamber (44) simply under the action of the force of gravity.

Furthermore, it should be noted that, the mixing of said monomer with the hardening substance could be effected in a different zone to that described, in an obvious way for the technical expert in this sector, in view of what has been previously said, and this is in a zone distanced form the said ends (50) and (51) or immediately on the outside of the tubular element (35); in particular, the tubular elements (34) and (35) could be shaped and reciprocally arranged in such a way as to assist the hardening substance extraction out of the tubular element (34) on the part of the outflowing monomer from the tubular element (35), by the depression and or in virtue of the moving effect due to the outflow speed difference of the products outflowing from the same tubular elements (34) and (35).

Finally, it should be noted that, the described device 1, completely achieves the prefixed objectives, from the moment in which it allows the use of only the necessary quantity of the monomeric substance each time, without prejudicing at all the characteristics of the substance which temporarily remains unused in the container.

Moreover, the described device 1, is able to, with the aim of permitting the user to choose whether the polimerization of the said monomer must occur in a short time or can occur in a relatively long period of time, to deliver only the monomeric substance housed in the container (5),or to mix a hardening substance to the same monomeric substance housed in the container (7).

What is claimed is:

1. A method for extruding a polymeric substance from a device that has a first pressurized container holding a monomeric substance that polymerizes upon air contact and a second container holding a hardening substance that accelerates polymerization of the monomeric substance, the method comprising the steps of:

manually pumping air at a pressure higher than atmospheric pressure into the second container;

selectively causing an outflow of the monomeric substance from the first pressurized container to a mixing zone of the hardening substance and the monomeric substance; and selectively causing an outflow of the hardening substance from the second container to the mixing zone.

2. The method of claim 1, further comprising the step of providing the outflow of the monomeric substance and the outflow of the hardening substance from separate tubes that are coaxial.

3. The method of claim 1, further comprising the step of controlling a flow rate of the hardening substance.

4. The method of claim 3, further comprising the step of stopping the flow of the hardening substance.

5. A method for extruding a polymeric substance from a device that has a first pressurized container holding a monomeric substance that polymerizes upon air contact and a second container holding a hardening substance that accelerates polymerization of the monomeric substance, the method comprising the steps of:

providing a pressure substantially equal to atmospheric pressure in the second container;

selectively causing an outflow of the monomeric substance from the first pressurized container to a mixing zone of the hardening substance and the monomeric substance; and selectively causing an outflow of the hardening substance from the second container to the mixing zone under the effect of the force of gravity.

6. The method of claim 5, further comprising the step of providing the outflow of the monomeric substance and the outflow of the hardening substance from separate tubes that are coaxial.

7. The method of claim 6, further comprising the step of facilitating extraction of the hardening substance from its respective tube by causing a difference in outflow speeds from the tubes.

8. The method of claim 5, further comprising the step of controlling a flow rate of the hardening substance.

9. The method of claim 8, further comprising the step of stopping the flow of the hardening substance.

10. A device extruding a polymeric substance, comprising:

a first pressurized container for holding a monomeric substance that polymerizes upon air contact;

a second container for holding a hardening substance that accelerates polymerization of the monomeric substance;

a first conduit that conducts the monomeric substance to a mixing zone where the hardening substance mixes with the monomeric substance;

a second conduit that conducts the hardening substance to the mixing zone; and a manual pump that pumps air into the second container up to a pressure that exceeds atmospheric pressure.

11. The device of claim 10, wherein the first and second conduits are coaxial adjacent to the mixing zone.

12. The device of claim 10, further comprising a flow regulator between the mixing zone and the second container that adjusts a rate of flow of the hardening substance through the second conduit.

13. The device of claim 12, wherein the flow regulator has a position that stops the flow of the hardening substance through the second conduit.

14. The device of claim 10, further comprising a pressure regulator between the mixing zone and the second container that adjusts a pressure of the hardening substance in the second conduit.

15. A device extruding a polymeric substance, comprising:

a first pressurized container for holding a monomeric substance that polymerizes upon air contact;

a second container for holding a hardening substance that accelerates polymerization of the monomeric substance;

a first conduit that conducts the monomeric substance to a mixing zone where the hardening substance mixes with the monomeric substance; and a second conduit that conducts the hardening substance to the mixing zone, the first and second conduits being coaxial at least adjacent to the mixing zone.

16. The device of claim 15, further comprising flow regulating means for regulating a flow rate of the hardening substance in the second conduit.

17. The device of claim 15, further comprising pressure regulating means for regulating a pressure of the hardening substance in the second conduit.

* * * * *